United States Patent [19]

Alfenaar et al.

[11] 4,048,386
[45] Sept. 13, 1977

[54] PROCESS FOR MAKING AN ELECTROCHEMICAL CELL OR BATTERY, E.G. A FUEL CELL OR FUEL CELL BATTERY, AND A CELL OR BATTERY MADE BY THE PROCESS

[75] Inventors: Marinus Alfenaar, Schinnen, Netherlands; René L. E. Van Gasse, Opglabbeek, Belgium

[73] Assignee: Stamicarbon B.V., Geleen, Netherlands

[21] Appl. No.: 713,584

[22] Filed: Aug. 11, 1976

[30] Foreign Application Priority Data

Aug. 14, 1975   Netherlands ..................... 7509675

[51] Int. Cl.² ............................................. H01M 8/24
[52] U.S. Cl. ..................................... 429/38; 29/623.1
[58] Field of Search ................. 429/38, 39, 34, 35, 429/36

[56] References Cited

U.S. PATENT DOCUMENTS

| 3,126,302 | 3/1964 | Drushella | 429/38 |
| 3,679,485 | 7/1972 | Kohlmuller et al. | 429/38 |
| 3,915,746 | 10/1975 | Kohlmuller | 429/39 |

*Primary Examiner*—John H. Mack
*Assistant Examiner*—H. A. Feeley
*Attorney, Agent, or Firm*—Cushman, Darby & Cushman

[57] ABSTRACT

An electrochemical cell or battery in a monolithic form is produced, in which a series of planar sheet electrodes are disposed in a framework of a fibrous material which contains a thermosetting resin. The process for forming the cell or battery is also disclosed.

6 Claims, 5 Drawing Figures

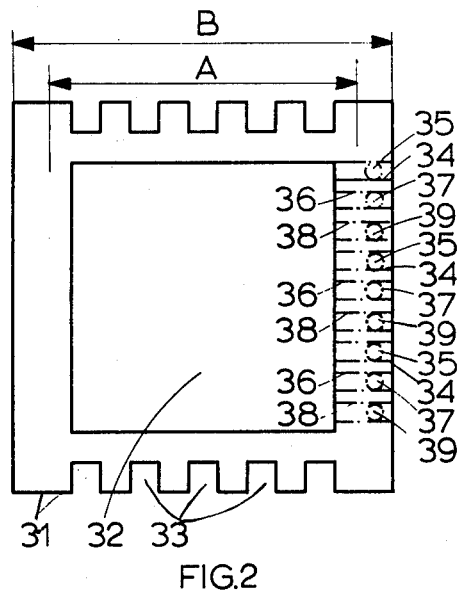
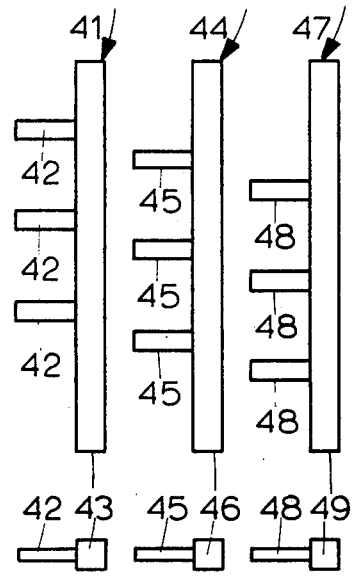
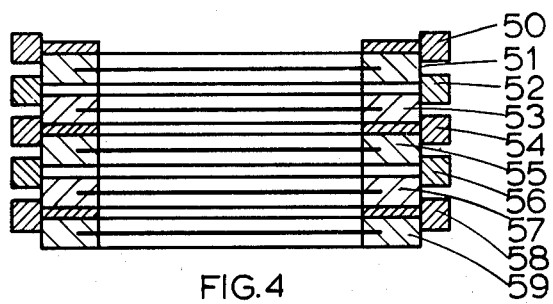
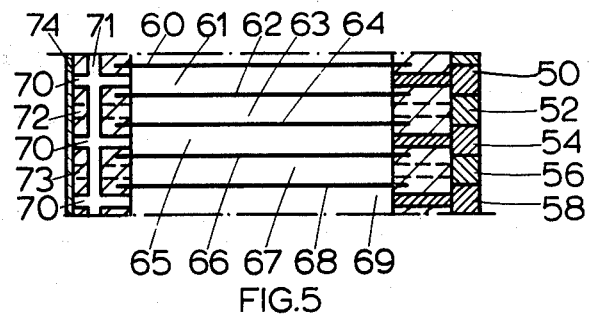

4,048,386

PROCESS FOR MAKING AN ELECTROCHEMICAL CELL OR BATTERY, E.G. A FUEL CELL OR FUEL CELL BATTERY, AND A CELL OR BATTERY MADE BY THE PROCESS

The invention relates to an electrochemical cell or battery. In addition, the invention relates to a process for making the electrochemical cell or battery, e.g., a fuel cell or a fuel cell battery, which consists of planar sheet electrodes disposed in a framework of a material comprising fibrous material interspersed in a thermosetting resin. In particular, the battery comprises a series of plate-shaped or sheet-shaped electrodes and disposed between the electrodes plate-shaped or sheet-shaped frames which form gas or liquid chambers between the electrodes.

BACKGROUND OF THE INVENTION

A fuel cell which is made by stacking an insulating material between planar sheet electrodes to form an assembly and clamping the assembly together is known. The known cell has several disadvantages: Sealing of the component parts is difficult. Leakage of electrolyte and gas readily occurs. When the gaseous fuel used in the cell is hydrogen, obiviously leakage is not only undesirable but very dangerous. Furthermore, the method of manufacture of the known cell inherently requires handling of the sheets and the electrode material. Modern electrode materials, engineered to be characterized by maximum high current density capabilities, are often characterized by vulnerable porous surfaces; handling such electrode materials can result in contamination of the pores or the porous surfaces thereof and blockage thereof. Because of the fact that these materials are generally pliable sheets, such damage may readily occur on handling. The known method is combersome and does not lend itself to automation.

SUMMARY OF THE INVENTION

The object of the invention is to provide an electrochemical cell or battery and a process of making that cell or battery, consisting of a stack of plate-shaped or sheet-shaped electrodes and disposed, between the electrodes, plate-shaped or sheet-shaped frames forming gas or liquid chambers between the electrodes which obviates the aforementioned disadvantages.

DESCRIPTION OF THE DRAWINGS

The invention will be elucidated with reference to the drawing in which the manufacture of a fuel cell battery according to the process of the invention is shown as a nonrestricting schematic example. The figures represent:

FIG. 2: a top view of a cut-off strip of fibrous material in which the required openings have been punched.

FIG. 3: top view and lateral view of three channeling combs.

FIG. 4: cross-section through part of a stacked pack.

FIG. 5: cross-section through part of a pressed fuel-cell block; the channeling combs have already been removed on the left-hand side, but not yet on the right-hand side.

Figure 1:
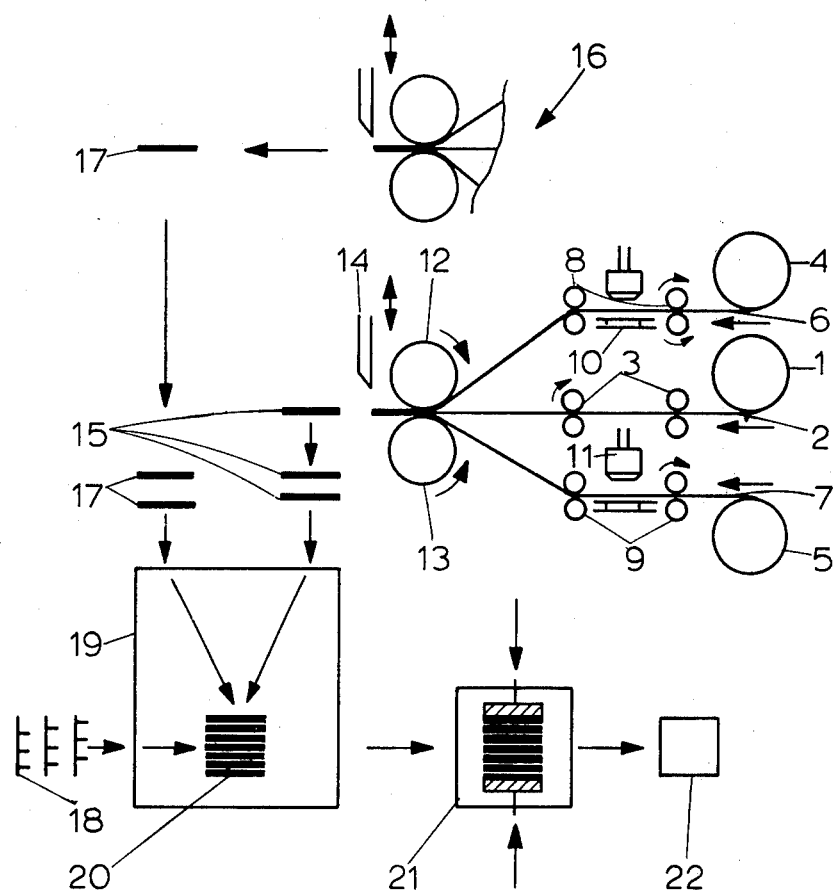
FIG. 1: a simplified diagram of an arrangement for carrying out the process according to the invention. The diagram represents an embodiment of the invention which is in undertaking the process of the invention continuously.

The reference figures in FIG. 1 denote the following:

1 roll of sheet-shaped electrode material for fuel electrodes;
2 band of electrode material unwound from roll 1;
3 guide rollers for guiding band 2;
4, 5 two rolls of fibrous web containing unpolymerized polyester, polymerization catalyst and filler;
6, 7 bands of fibrous-web material unwound from rolls 4 and 5;
8, 9 guide rollers for bands 6 and 7;
10, 11 punching devices for punching openings in bands 6 and 7, which will form chambers or other open spaces in the finished fuel cell;
12, 13 two heatable rollers between which band 2 and the punched bands 6 and 7 can be stuck together with some pressure in the right position; to this end the temperature of the rollers 12 and 13 is such (e.g. 80° C) that the polyester in the fibrous-web material has some tack, but does not yet polymerize;
14 cutting device for cutting the adhering bands in the right place;
15 stacking elements thus obtained; each stacking element forms, as it were, a framed fuel electrode that is rigid enough for further mechanical treatment;
16. unit similar to the one denoted above by the FIGS. 1 through 14, but in which electrode material for oxygen electrodes is used;
17 stacking elements with oxygen electrode;
18 channeling combs;
19 stacking device for stacking a number of stacking elements 15 and 17, spacing combs 18 and intermediate and end plates, if any, in the right sequence and in the right position;
20 pack obtained after stacking;
21 heatable press in which such a pack is subjected with some pressure to a temperature (e.g. 120° C) at which the polyester in the fibrous-web polymerizes;
22 a finished fuel cell block from which combs 18 have been removed.

By preference, the bands of fibrous material 6 and 7 are at least so much wider than the band of electrode material 2 that the edges projecting on both sides are wide enough to accommodate passages to the formed channels that will be made. This is shown in FIG. 2, where A denotes the width of the electrode material and B the width of the fibrous-web material.

The reference figures in FIG. 2 have the following meanings:

31 punched and cut sheet of fibrous-web material, as stuck on a sheet of electrode material;
32 punched half of chamber for gas or liquid, such as fuel gas, electrolyte or air (the other half of the chamber will be formed by the strip placed on the opposite electrode);
33 punched openings; in these places the electrode material is not covered by insulating fibrous-web material so that, in the finished block, terminal lips for electric connections or for the interconnection of electrodes can be formed here by the bare electrode material;
34 dotted-line projection of the channel to be formed for passing through a first gas or liquid, e.g. fuel gas, to the relative chambers;

35 passages, in dotted lines, to be drilled in the finished block for feeding the above-mentioned first gas/liquid to channels 34;
36, 37 same as 34 and 35, but for the supply of a second gas or liquid, e.g. air;
38, 39 same as 34 and 35, but for the supply of a third gas or liquid, e.g. electrolyte.

Corresponding channels and passages for the discharge of the gases and liquids are made in the opposite sides of the chambers.

FIG. 3 shows a top view and a lateral view of the three types of channeling combs that are required in the example for the formation of the three types of chambers; the reference figures denote:

41 channeling comb for the formation of channels 34 and consisting of:
42 strips that are inserted between the elements when the pack is stacked;
43 cross-strip to which strips 42 have been connected, e.g. by welding, soldering or otherwise; the comb may also be made of one piece of material;
44 channeling comb for the formation of channels 36;
45, 46 strips and cross-strip of comb 44;
47 channeling comb for the formation of channels 38;
48, 49 strips and cross-strip of comb 47.

FIG. 4 is a section through part of a stacked pack, where the figures denote:

50 channeling comb of the type 47;
51 element with fuel electrode;
52 channeling comb of the type 41;
53 element with fuel electrode;
54 channeling comb of the type 47;
55 element with oxygen electrode;
56 channeling comb of the type 44;
57 element with oxygen electrode;
58 channeling comb of the type 47;
59 element with fuel electrode, etc.

FIG. 5 shows a section through part of a fuel cell block. The combs have not yet been removed on the right-hand side; the cross-strips of the combs 50, 52, 54, 56 and 58 rest against each other and limit the extent to which the pack can be compressed. On the left-hand side, the channeling combs have been removed, the channels have been sealed on the outside, and the passages have been drilled. The other reference figures denote:

60 fuel electrode;
61 electrolyte chamber;
62 oxygen electrode;
63 oxygen chamber or air chamber;
64 oxygen electrode;
65 electrolyte chamber;
66 fuel electrode;
67 fuel chamber;
68 fuel electrode;
69 electrolyte chamber;
70 electrolyte channels;
71 drilled passage for electrolyte;
72 oxygen or air channel (in dotted lines);
73 fuel channel (in dotted lines);
74 film stuck to the pressed block for sealing channels 70, 72, 73, etc. on the outside.

DETAILED DESCRIPTION OF THE INVENTION

The invention is directed to forming an electrochemical cell or battery, which comprises a monolithic framework, of a thermosetting plastic containing fibrous material, in which are disposed a plurality of electrodes ranged in a position parallel to each other and spaced apart in a manner to form voids between the electrodes. The voids form chambers for receiving gas or liquid, such as fuel gas or air or electrolyte.

The first step of the process comprises providing at least one electrode in sheet form. Such electrodes are wel known in the art. The material of the framework which is used in conjunction with the electrode material comprises a mixture of fibrous material, an unpolymerized thermosetting resin, and polymerization catalyst. This material is in sheet form. The sheets are cut to form an opening which is centrally disposed with respect to the outer edges of the sheet material, thereby forming a frame-like structure. The fibrous web-like material is dry and the unpolymerized thermosetting plastic contained therein is dry.

An assembly of at least one electrode panel and at least one of the aforementioned frame-like pieces of fibrous-web material are assembled. Assembly comprises disposing the electrode panel on top of the frame of fibrous-web material and subjecting the two components to a pressure and temperature sufficient to cause the fibrous-web material to adhere to the electrode but insufficient to cause polymerization of the unpolymerized thermosetting plastic material. Alternatively, the electrode panel may be disposed between two sheets of the frame-like fibrous-web material and then subjected to the aforementioned conditions to form an assembly of the electrode panel disposed between and adhering to two of the frame-like fibrous-web material structures.

Thereafter, a plurality of those assemblies are aligned and stacked. When only one sheet of framework has been applied to the electrode to form the assembly, alignment and stacking requires that the assemblies be arranged so that there is an alternating pattern of electrode and insulating material. Between assemblies are disposed elements of a material which are inert to the thermoplastic and which are disposed to intersect with the opening (centrally disposed within the framework) and with at least one edge of the sheet of the fibrous-web material. The element should be formed of a material which is inert to the thermoplastic and is inert to the process conditions. Preferably these elements are the teeth of a comb-like structure; under these conditions, a plurality of said elements are disposed between the assemblies.

Subsequently, the stack of assemblies is subjected to sufficient pressure and temperature, to cause the thermosetting plastic to polymerize.

After polymerization, the aforementioned elements are withdrawn from the stack. The presence of the elements within the stack, positioned in the manner described above, results in the formation of channels from the opening of the framework to the exterior edge of the framework. The result is a monolithic structure which contains openings on the outside edge of the structure. These openings are parallel to the parallel electrode panels.

Subsequently, passages are cut into the monolithic structure, which passages are perpendicular to the channels and intersect with the channels formed. The open ends of the channels are then sealed.

It should be noted that in the step of cutting the opening in the insulating material to form the framework used in the step of forming the assembly, also cut-outs at the edges of the framework may be punched, for instance, in a manner set forth in FIG. 2, with reference to elements 31 and 33 of the drawings. The punchouts denoted by 33, allow terminal lips for electrical connections.

Formation of the channels, outlined above, is preferably effected by elements which are sets of strips. Preferably, the sets of strips are attached perpendicularly to a cross-strip, thereby forming a comb-shaped unit. The comb-shaped unit has been referred to above, in the discussion of the drawings, as a "channeling comb". Preferably, the cross-strips are of such a thickness that, when the stack is heated under pressure, the successive cross-strips come to rest one against the other and thus limit the extent of compression of the stack. Preferably, the strips, or channeling combs, are made of metal. To facilitate removal of the strips or combs from the finished block, the strips or combs may be lined with a thin layer of material that does not stick to thermosetting plastic, e.g., a layer of polytetrafluoroethylene.

The fibrous-web material, must naturally be resistant to liquids and gases to be used in the cell, mechanically stable and sufficiently strong at the operating temperature of the cell. Operating temperatures of the cell may range, for instance, between 50 and 200° C. Thus, preferably, the fibrous web material contains glass fibers as the fibrous filler. Alternative materials for use as the fibrous filler in the fibrous-web material include asbestos or other inorganic fibers, polyester fibers, polyamide fibers to name a few; other organic fibrous material and mixture of fibrous materials, may be used. Woven fabrics, e.g. woven nylon fabric, may also be used.

The thermosetting plastic which is used in accordance with the process of the invention must be resistant to the liquids and gases to be used in the cell, in particularly chemically and electrically inert, mechanically stable and sufficiently strong. Suitable examples of such thermosetting plastics are modified or non-modified polyesters, epoxy resins, polyvinyl esters, polyacrylates and the like.

Although a specific embodiment has been set forth in the drawings, alternatives to these embodiments are obviously contemplated by the invention. If necessary, porous spacers (not shown) can be placed in the chambers during stacking to prevent electrodes which are not absolutely flat from touching each other. The spacers may be made, for instance, of corrugated, perforated plates or fabrics of, e.g., polypropylene, or fibrous-webs of polypropylene or polytetrafluoroethylene fibers.

While specific shapes are set forth in the drawings, the materials and shapes set forth in the drawings and the disclosure above are given by way of illustration only. Generally, the frame-like structure of the insulating material sheet is larger than the electrode panel; and generally the electrode panel is positioned to be centrally disposed upon the frame structure. As set forth above, the electrode panel may be disposed between one or two frame-like structures of fibrous-web material.

While the drawings depict electrodes and frame structures of fibrous-web material, of particular configuration, it is clear that no particular configuration is critical to the invention.

It is not necessary to carry out all the steps of the process in one and the same place. The process can be interrupted at will at any point where a suitable intermediate product has been obtained and be continued in another place until the desired end product is obtained.

Although, in conjunction with the discussion of the drawings, cells for gaseous fuel and oxygen as an oxidant were discussed, the invention must also be deemed to encompass the manufacture of stack cells or batteries for liquid fuel and/or additional gaseous or liquid oxidants, other than oxygen. Clearly, the invention is directed to forming cells for electrolysis and electrodialysis, as well as to cells discussed above.

The process encompasses the manufacture of electrochemical cells or batteries whose electrolyte chambers have been divided into several compartments by means of membranes, e.g. semi-permeable or ion-exchange membranes. Under these circumstances, the process of the invention is undertaken by employing bands or panels of membrane material which are treated in a manner identical to the manner in which the electrode panels are used in accordance with the invention. The dimensions of the exact embodiments set forth in the application are limited only by the structural possibilities of the production equipment and the rigidity of the material used to form the cell.

What is claimed is:

1. A process for making an electrochemical cell, consisting of a stack of plate-shaped or sheet-shaped electrodes and, between each of the electrodes, plate-shaped or sheet-shaped frames forming gas or liquid chambers, comprising
   a. providing at least one electrode, in sheet form, and at least one dry sheet of fibrous-web material which contains a dry unpolymerized thermosetting plastic, polymerization catalyst and fibrous filler, wherein said sheet of fibrous-web material has been cut to form an opening centrally disposed in the sheet;
   b. disposing two of said sheets of fibrous-web material one of said electrodes and subjecting said assembly to sufficient pressure and temperature to cause the fibrous-web material to adhere to the electrode but insufficient to cause polymerization of the thermosetting plastic;
   c. stacking a plurality of said assembly together, while channel-forming elements of material inert to the thermoplastic are disposed to intersect with said opening in said insulating material and at least one edge of the sheet of insulating material, to form a stack;
   d. subjecting the stack to sufficient pressure and temperature, to cause the thermo-setting plastic to polymerize;
   e. withdrawing said channel-forming elements from the stack, thereby producing channels in the resulting block; cutting passages into the block perpendicular to the channels and intersecting with said channels; and sealing the open ends of the channels at the end of the channel which intersected with the edge of the sheet.

2. Process according to claim 1, wherein the formation of the channels is effected with the use of sets of said elements which are perpendicularly attached to a cross-strip, to form a comb-shaped unit.

3. Process according to claim 2, wherein the cross-strips are of such thickness that, when the stack is heated under pressure, the successive cross-strips come to rest against each other and thus limit the extent of compression of the stack.

4. Process according to claim 1, wherein said sheet of fibrous-web material is wider than the said electrode to allow edges of the fibrous-web material to project on both sides of the electrode to accommodate said passages.

5. Electrochemical cell made by the process according to claim 1.

6. Fuel cell or fuel cell battery made by the process according to claim 1.

* * * * *

UNITED STATES PATENT OFFICE
CERTIFICATE OF CORRECTION

Patent No. 4,048,386　　　　　　　　　Dated September 13, 1977

Inventor(s) Marinus ALFENAAR and Rene L.E. VAN GASSE

It is certified that error appears in the above-identified patent and that said Letters Patent are hereby corrected as shown below:

Column 6, line 40, after "material" insert --on--.

Signed and Sealed this

Twenty-seventh Day of June 1978

[SEAL]

Attest:

RUTH C. MASON
Attesting Officer

DONALD W. BANNER
Commissioner of Patents and Trademarks